United States Patent
Roberts

(10) Patent No.: US 7,653,422 B2
(45) Date of Patent: Jan. 26, 2010

(54) METHOD AND APPARATUS FOR A SLIDING HINGE

(75) Inventor: Andrew D. Roberts, Kenilworth (GB)

(73) Assignee: Motorola, Inc., Schaumburg, IL (US)

( * ) Notice: Subject to any disclaimer, the term of this patent is extended or adjusted under 35 U.S.C. 154(b) by 648 days.

(21) Appl. No.: 11/364,373

(22) Filed: Feb. 28, 2006

(65) Prior Publication Data
US 2007/0199177 A1  Aug. 30, 2007

(51) Int. Cl.
H04M 1/00 (2006.01)
G06K 7/10 (2006.01)
E05D 7/10 (2006.01)
E05D 11/10 (2006.01)
A47G 27/06 (2006.01)
A47G 27/04 (2006.01)
E05D 11/06 (2006.01)
H05K 7/16 (2006.01)

(52) U.S. Cl. ............ 455/575.4; 455/575.1; 235/472.02; 16/330; 16/266; 16/14; 16/9; 16/258; 361/727

(58) Field of Classification Search ............. 455/575.4, 455/575.3; 16/9, 14, 266, 258; 235/472.02; 361/727
See application file for complete search history.

(56) References Cited

U.S. PATENT DOCUMENTS 5,335,274 A   8/1994  Masuda et al.
2004/0085739 A1 *  5/2004  Lee et al. ............ 361/727
2004/0157653 A1   8/2004  Kato
2005/0138772 A1 *  6/2005  Park ............... 16/330
2006/0124746 A1 *  6/2006  Kim et al. ............ 235/472.02
2006/0135222 A1 *  6/2006  Kim ............... 455/575.1

* cited by examiner

Primary Examiner—Vincent P Harper
Assistant Examiner—Timothy Pham
(74) Attorney, Agent, or Firm—Gary J. Cunningham

(57) ABSTRACT

Disclosed is an apparatus and method for a slide and tilt hinge mechanism. The slide and tilt mechanism comprises an upper element (102) having a top (140) and a bottom (132) and an angled (130) portion located at an end (144) of the upper element, the angled portion angled relative to the top and the bottom of the upper element. A lower element (104) having a first lower element portion (122) and a second lower element portion (124) coupled together by a joint (126), the joint allowing the first lower element portion to fold relative to the second lower element portion and the upper element. A slide enabling member (302/304), coupling the upper element to the lower element such that when the upper element and the lower element are in a closed configuration (100), the upper element prevents the lower element from folding. A biasing member (128), biasing the lower element to fold about the joint when the upper element is slid to an extended position.

21 Claims, 4 Drawing Sheets

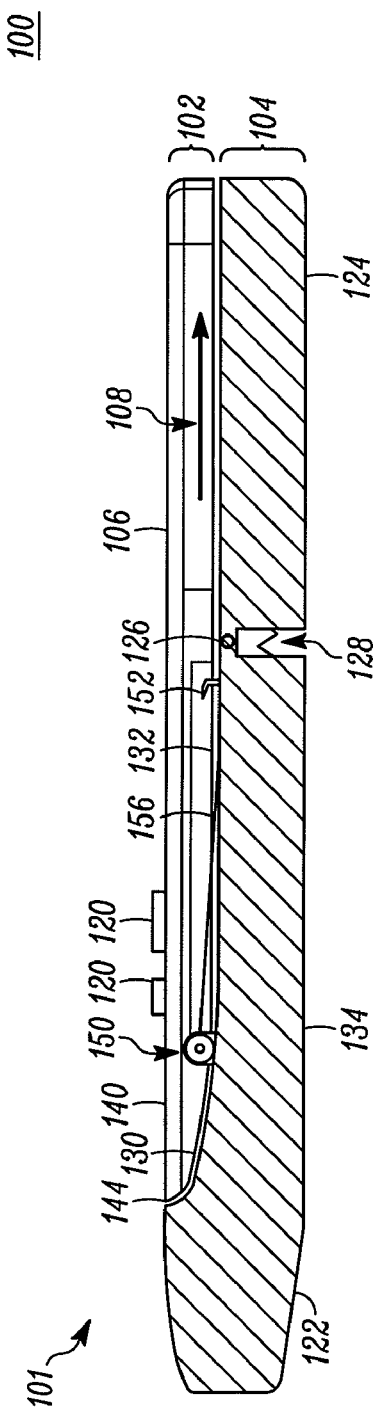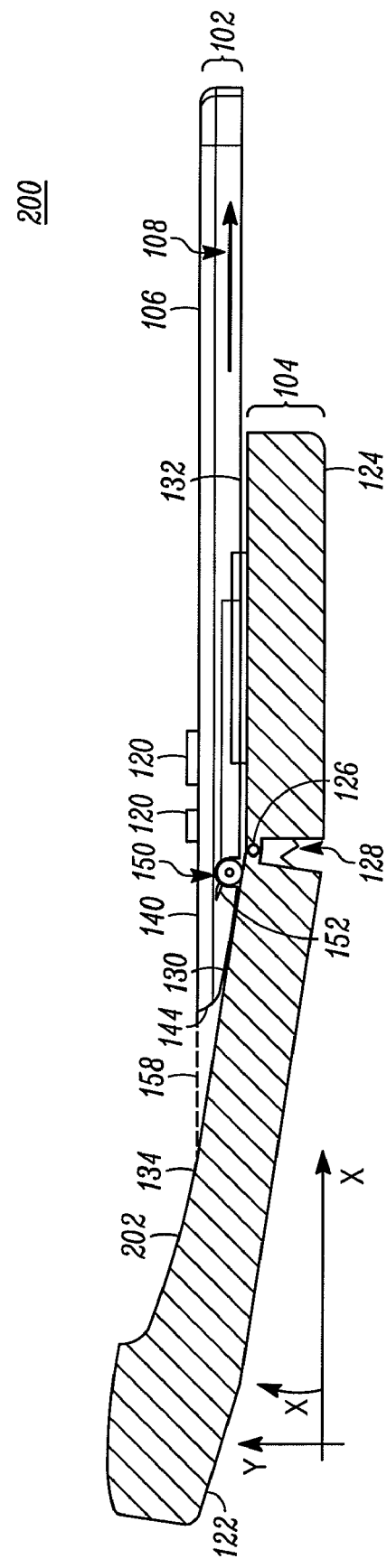

METHOD AND APPARATUS FOR A SLIDING HINGE

FIELD OF THE INVENTION

The present invention relates generally to sliding devices and, more particularly to sliding devices that have a rotating hinge portion.

BACKGROUND

Handheld device are continually being reduced in size and improved to meet consumer size, aesthetic, and performance requirements. Slider solution mechanisms permit parts of such devices, such as displays or keypads, to be retracted and hidden when not in use. Slider mechanisms can facilitate miniaturization and offer additional freedom to device designers. However, current sliding mechanisms are complex, bulky, heavy, and expensive. Current sliding mechanisms add significantly to the weight of the devices in which they are incorporated. Further, current sliding mechanisms are relatively thick, making it difficult to incorporate them into aesthetically-pleasing designs.

Known slider solutions have the main display on the outside of the product, however the ergonomics in the open position are not as good as a clam style (i.e. folding type of form factor). The known slider solutions have the following disadvantages: there is an inevitable step, resulting in a difference in heights between the top and bottom housing portions. Therefore the user interface and navigation part of the keypad sits above the numeric element making the overall ergonomics of the keypad poor. The difference in height also makes integrating of the styling between the bottom and top module difficult. The products tend to look disjointed. Most slider motions are flat so when placed on a desk they sit flat like a bar. This does not support the video and multi media user cases required for the trend toward higher tier 3G and beyond communication devices.

The various aspects, features and advantages of the present invention will become more fully apparent to those having ordinary skill in the art upon careful consideration of the following Detailed Description of the Invention with the accompanying drawings described below.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is an exemplary cross sectional view of the slide and tilt hinge mechanism in a closed configuration.

FIG. 2 is an exemplary cross sectional view of the slide and tilt hinge mechanism in an open configuration.

Figure 3:
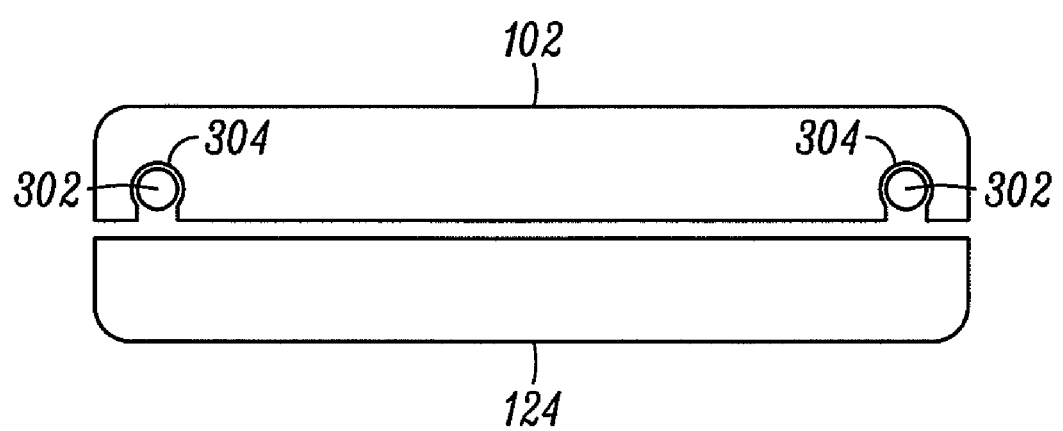
FIG. 3 is an exemplary cross sectional view of the slide enabling mechanism.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

While the present invention is achievable by various forms of embodiment, there is shown in the drawings and described hereinafter several examples of embodiments with the understanding that the present disclosure is to be considered an exemplification of the invention and is not intended to limit the invention to the specific embodiments contained herein as will become more fully apparent from the discussion below. It is further understood that the apparatus and method for a slide and tilt hinge of the present invention may be used more generally in any application where it is desirable to provide slideably hinged housings.

In overview, the present disclosure concerns slider mechanisms for components such as those on portable electronic devices including, for example, laptop computers, portable video players, handheld computers, wireless messaging devices, portable game players, GPS mapping devices, pagers, portable dictionaries, personal digital assistants, cellular telephones, and equivalents and combinations thereof.

As further discussed below various inventive principles and combinations thereof are advantageously employed to provide a slider mechanism for permitting a component to be moved relative to another component in an electronic device while substantially hiding the apparatus that permits such movement, thus alleviating various problems associated with known sliding mechanisms, provided these principles or equivalents thereof are employed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Before describing in detail exemplary embodiments that are in accordance with the present invention, it should be observed that the embodiments reside primarily in combinations of apparatus components and method steps related to the sliding hinge of an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It is further understood that the use of relational terms, if any, such as first and second, top and bottom, upper and lower and the like are used solely to distinguish one from another entity or action without necessarily requiring or implying any actual such relationship or order between such entities or actions.

The terms "a" or "an" as used herein are defined as one or more than one. The term "plurality" as used herein is defined as two or more than two. The term "another" as used herein is defined as at least a second or more. The terms "including," "having" and "has" as used herein are defined as comprising (i.e., open language). The term "coupled" as used herein is defined as connected, although not necessarily directly.

In this exemplary embodiment, the device is an electronic device such as a radiotelephone. The radiotelephone described herein is a representation of the type of wireless communication device that may benefit from the present invention. However, it is to be understood that the present invention may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the radiotelephone 100 should also be considered to apply equally to other portable wireless electronic devices.

An electronic device has a first housing portion and a second housing portion that slide and tilt relative to each other to result in compact and extended positions, as well as intermediate positions. The slide and tilt mechanism includes an upper element having a top and a bottom and an angled portion located at an end of the upper element, the angled portion angled relative to the bottom of the upper element. A lower element having a first lower element portion and a second lower element portion coupled together by a joint, the joint allowing the first lower element portion to fold relative to the second lower element portion and relative to the upper element. A slide enabling member, coupling the upper element to the lower element such that when the upper element and the lower element are in a closed configuration, the upper element prevents the lower element from folding. A biasing member, biases the lower element to fold, i.e. rotate about the joint when the upper element is slid to an extended position. A mechanism that permits the sliding and rotating motion is described in detail below.

An embodiment of an electronic device 101 incorporating a slide and tilt mechanism is shown in FIG. 1 and FIG. 2. FIG. 1 illustrates a cross section of the device 101 in a compact, closed or retracted configuration 100. FIG. 2 illustrates a cross section of the device 101 in the extended and tilted configuration 200.

The exemplary device 101, which may be a radiotelephone in this case, includes an upper element 102 and a lower element 104. In the closed configuration 100, both the upper element and the lower element are planarly adjacent. In the open configuration 200, the lower element is laterally off-set from the upper element and a portion of the lower element is folded toward the upper element exposing a top surface 134 of the lower element 104.

The upper element 102 includes a display 106 and various buttons 120, navigation buttons in this embodiment. The upper element 102 also includes a tapered portion 130. The tapered portion is angled relative to a first side 132 of the upper element 102. A keypad 202 is carried on the top surface 134 of lower element 104.

The upper element 102 slides, as indicated by arrow 108 with respect to the lower element 104 to expose the top surface 134 and, in this exemplary embodiment, the keypad 202. A user can apply manual force in the longitudinal direction of the device 101 to cause the upper element 102 to slide with respect to the lower element 104 thus causing the keypad 202 to extend and tilt in relation to the upper element 102 from the configuration shown in FIG. 1 or to retract from the configuration shown in FIG. 2.

The lower element 104 is made up of two portions, a first lower element portion 122 and a second lower element portion 124 which are longitudinally adjacent (i.e. end to end) and coupled together by a joint 126. In this embodiment, the upper element 102 is shorter than the lower element 104, wherein the lower element extends beyond the first lower element portion 122. The lower element in this embodiment, has a end portion that is complementary in shape to the tapered portion 130 of the upper element 102. In another embodiment, the upper element 102 and the lower element are substantially the same size and have an elongated shape. The first lower element portion 122 bends or rotates relative to the second lower element portion 124 about the joint 126 to angle upward toward the upper element 102 when the upper element 102 is slid to the extended configuration 200.

The joint 126 is positioned at or near the top surface 134 of the lower element 104. The joint may be a hinge, such as a barrel and pin hinge, a resilient member such as rubber or plastic, or the like. The joint 126 is positioned so that the first lower element portion 122 and the second lower element portion 124 fold in one direction toward the upper element 102.

When sliding from the closed configuration 100 to the open configuration 200, a first upper element portion bottom surface 132 slides in contact with a first lower element portion top surface 134. The tapered portion 130 comes in contact with the first lower element portion top surface 134 when the tapered portion 130 approaches the joint 126. The tapered portion 130 is a follower that interacts with the lower element portion top surface 134 which a portion thereof is a cam. The tapered portion 130 allows the first lower element portion 122 to rotate about the joint 126 in a cam/follower motion. Until the tapered portion 130 substantially reaches the joint 126, the upper element 102 prevents the first lower element portion 122 from rotating, thereby holding the first and second lower element portions in the same plane as shown by the configuration in FIG. 1. From the fully closed configuration 100 to a point prior to the open configuration 200, the distance between the cam surface of the tapered portion 130 and the top surface 134 of the first lower element portion 122 is between 0.1 mm and 0.5 mm. In one embodiment the distance is 0.3 mm. The angle of the tapered, which dictates that angle of the first lower element portion 122 may be between zero and ninety degrees relative to the bottom surface 132. In this exemplary embodiment the angle of the tapered portion is 10 degrees relative to the bottom surface 132 in this exemplary embodiment.

In addition to providing a follower, the tapered portion 130 may provide a mechanical stop, stopping the first lower element portion 122 during rotation at the desired angle for the open configuration 200 of the device 101. In this embodiment, the angle of the tapered portion 130, dictates the angle of the first lower element portion 122 and the keypad 202 thereon. The tapered portion 130 allows a top surface 140 of the upper element 102, and hence the buttons 120 disposed thereon to be in close proximity to the top surface 142 of the first lower element portion 122. The plane of the top surface 140 of the upper element 102 intersects the top surface 142 of the first lower element portion 122. This provides a substantially continuous surface from the top surface 140 of the upper element 102 to the top surface 142 of the first lower element portion 122. This allows for a more seamless user interface because the keypad 202 is adjacent to the buttons 120 when the device 101 is in the open configuration 200. For example, the user may slide a finger from the keypad 202 to the buttons without having to substantially lift the finger up to the top surface of the upper element 102 which would be the distance equal to the thickness of the upper element 102 at the thickest point. This is a function of the thickness of the taper portion at the bottom end 144 of the upper element 102. The bottom end 144 of the upper element 102 in FIG. 1 is not to scale and is exaggerated for clarity.

A first biasing member 128 is coupled between the first lower element portion 122 and the second lower element portion 124. The biasing member exerts a force on the first lower element portion 122 and the second lower element portion 124, causing the first lower element portion 122 to rotate about the joint 126 relative to the second element portion 124. The first biasing member 128 may be an elastic biasing member (such as an expansion spring, a compression spring, or an elastic band), a cam follower mechanism or the like. The biasing member applies a constant bias force to urge the first lower element portion 122 and the second lower element portion 124 to fold together.

A second biasing member may be employed to assist the upper housing when sliding, into the open and closed position creating a bi-stable effect. The second biasing member may be an elastic biasing member (such as an expansion spring, a compression spring, or an elastic band) and a cam (such as a slot or track) having a geometry so as to create the bi-stable effect of urging the first housing portion and the second housing portion out of any intermediate position and toward either the compact or extended position.

In one exemplary embodiment, illustrated in FIG. 1 and FIG. 2, the upper housing carries a bearing such as a wheel 150. The wheel is located at the tapered portion 130 of the upper housing 102. Instead of the tapered portion 130 engaging the top surface of the first lower element portion 122, the wheel 150 engages the first lower element portion 122 when the housing is near the open configuration 200. One wheel 150 is shown however it is understood that a plurality of wheels may be used.

The wheel contacts the first lower element portion 122 when the device is substantially in the open/extended configuration. During the closing of the device 101, the wheel starts off in contact with the first lower element portion 122. As the upper element is slid toward the closed configuration 100, the wheel rolls along the first lower element portion 122 and reduces the friction between the upper element and the first lower element portion 122 when sliding the two elements relative to one another (i.e. closing the device). As the upper element 102 is slid towards the close position the first lower element comes in contact with the first surface of the upper element and the wheel and the tapered portion 130 separate from the first lower element portion 122. During this motion, the first lower element 122 and the second lower element rotate or unfold to a substantially flat configuration wherein the first lower element portion 122 and the second lower element portion 124 are longitudinally aligned in substantially the same plane as is shown in the closed position 100.

It is understood that a bearing surface may take the place of the wheel 150. The bearing surface may be a component or coating made of Delrin®, other friction reduced surface or the like. In one embodiment, a wheel 150 and a bearing surface are used in combination with each other. In this exemplary embodiment, an upper housing bearing surface 132 (i.e. the bearing surface is the bottom surface) and a first lower element portion 122 bearing surface 134 (the first lower element portion top surface 134 is the bearing surface) come into contact during sliding. As the upper element 102 approaches the closed configuration 100, the contact point between the upper element 102 and the first lower element portion 122 transitions from the wheel to the surfaces, e.g. the bearing surfaces, of the upper element 102 and the first lower element portion 122.

An exemplary retaining or latching member 152 is illustrated in FIG. 1. The latching member is carried on the first lower element portion 122 adjacent to the joint 126. The latching member engages an upper element latching receptacle (not shown). When the upper element 102 is slide to the open configuration 200, the latching member engages the upper element latching receptacle. Although a first biasing member 128 urges the first lower element portion 122 to be in contact with the upper element 102, the biasing force of the first biasing member 128 may be overcome by manual force for example, and therefore may cause the two elements to separate. The latching member 152 engages the upper element 102 to hold the upper element 102 to the first lower element portion 122 when the device 101 is in the open configuration 200. As the upper element slide, the latching member 152 slides with a void (not shown) of the upper element.

A cross section of the device showing an exemplary slide enabling member of the device 101 is illustrated in FIG. 3. The exemplary slide enabling member provides a mechanism for the upper element 102 to slideably engage the lower element 104. In this embodiment, the upper element 102 is slideally engaged to the second lower element portion 124. The slide enabling member, in this embodiment, comprises a set of rails 302 and a set of tracks 304 that engage the rails. The rails 302 are carried on the second lower element portion 124 and the tracks 304 are carried on the upper element 102. The upper element portion 102 slides along the rails 302 between the closed configuration 100 and the open configuration 200. It is understood that one of ordinary skill in the art will appreciate the plurality of slide enabling members that may be incorporated and that the rail and the track are one example. Mechanical stops in combination with the second biasing member, define the points at which the upper housing stops in the open and in the closed configurations. It is also understood that the rails 302 may be carried on either the upper element portion 102 or the second lower element portion 124 and the rail engaging members (e.g. tracks) may be carried on the element that the rails are not carried on.

Figure 4:
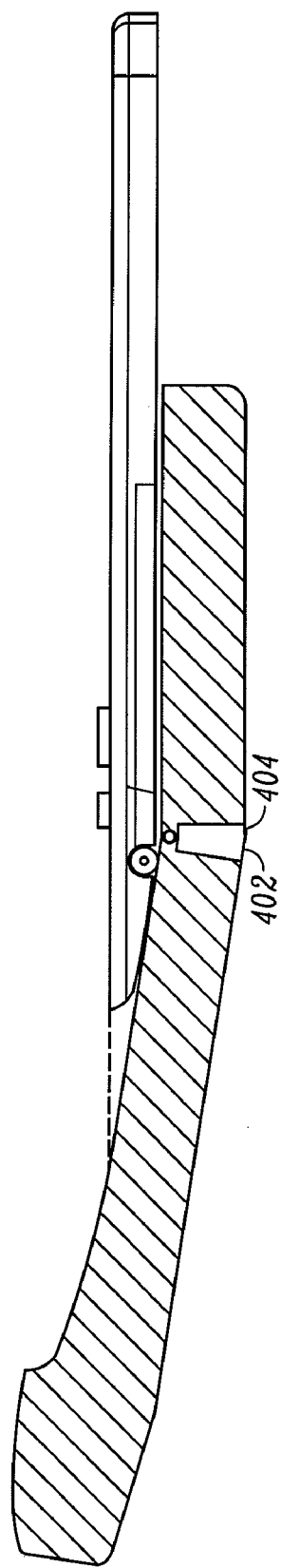
FIG. 4 is an exemplary cross sectional view of the slide and tilt hinge mechanism in an open configuration.

In one embodiment shown in FIG. 4, the lower element 104 includes overlapping portions at adjacent ends of the first lower element portion 122 and the second lower element portion 124. The first lower element portion 122 includes a first lower element overlapping portion 402 and the second lower element portion 124 includes a second lower element overlapping portion 404 that overlap in both the closed position and the open position. When the device is configured from the closed configuration 100 to the open configuration 200, the first lower element overlapping portion 402 and the second lower element overlapping portion 404 enclose the gap that is created when the first lower element portion 122 rotates away from the second lower element portion 124.

A flexible boot may also be coupled between the first lower element portion 122 and the second lower element portion 124. The flexible boot may be rubber or the like or have an accordion shaped form factor that bellows in and out and the two elements rotate relative to one another.

Figure 5:
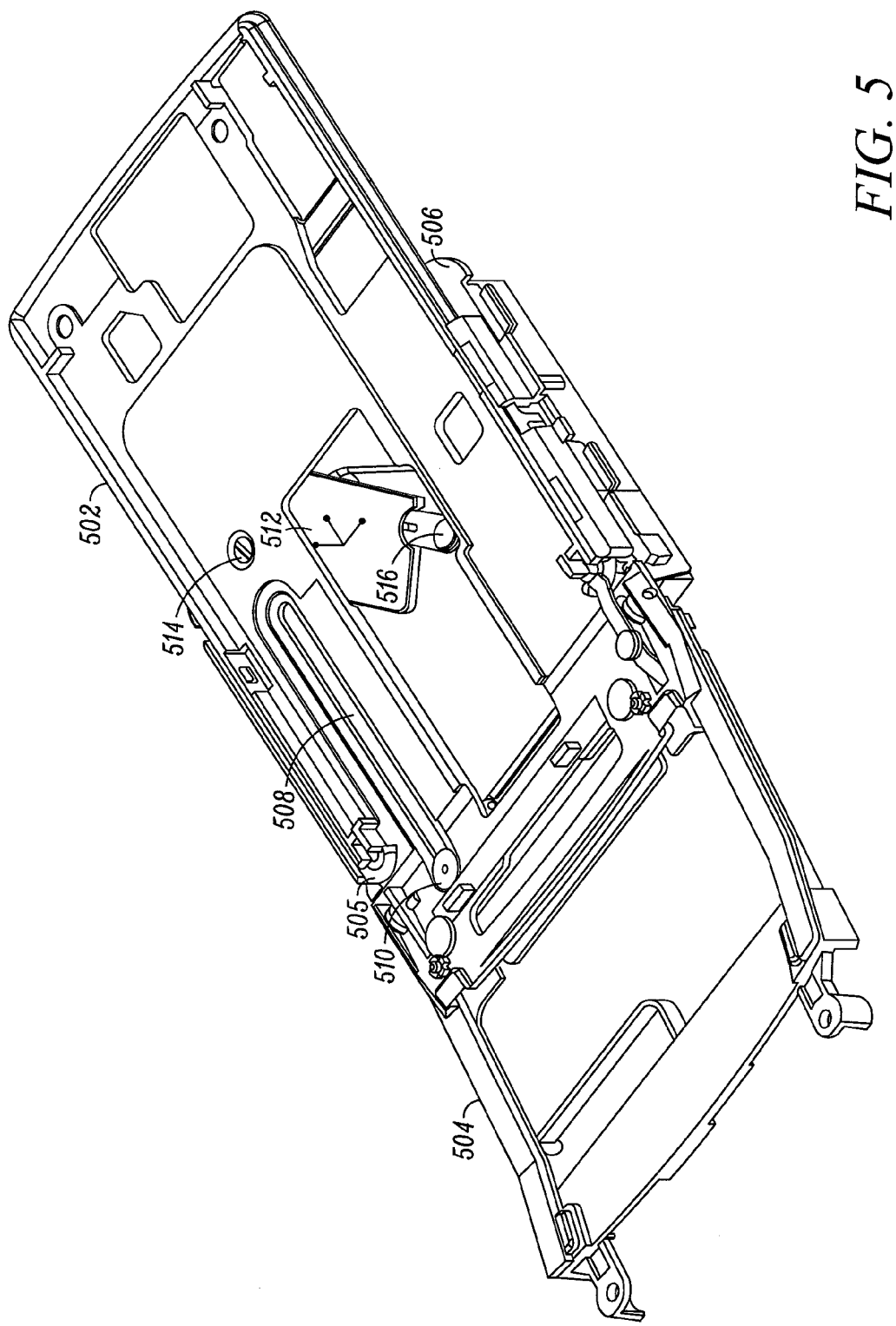
FIG. 5 is an exemplary perspective view of a slide and tilt hinge mechanism in an open configuration.

One alternative embodiment of the slide and tilt mechanism is illustrated in FIG. 5 having the upper element 502 slideably coupled to a first lower element 504 which hingedly couple to a second lower element 506. The upper element 502 is slideably coupled to the first lower element 504 by a rail 505 carried on the upper element 502. The upper element includes a slot 508 that is a void which runs longitudinally along the upper element 502. A retaining member 510 is carried on the first lower element 504 extending into the slot 508. The top of the retaining member is wider than the slot 508 such that the retaining member 510 will not pass through the slot 508 thereby retaining the upper element 502 to the first lower element 504. As the upper element slides relative to the first lower element 504, the retaining member 510/slot 508 combination prevent the upper element 502 and the first lower element from separating. In this embodiment, the device comprising a latching member that extends from the first lower element into the slot of the upper element, the latching member slides along the slot retaining the upper member adjacent to the first lower element portion as the upper element is slid from the close configuration to the open configuration. The bi-stable biasing member 512 is shown coupled to the upper element 502 and the second lower element 506. The bi-stable biasing member 512 is coupled to the upper element 502 by fastener 514 and to the second lower element 506 by fastener 516.

A method for opening the slide and tilt housing comprises providing a sliding mechanism to allow an upper housing to slide relative to a lower housing, wherein the upper housing is stacked on top of the lower housing. The lower housing has first lower housing portion and a second lower housing portion, and the first lower housing portion and a second lower housing portion are coupled together by a hinge. The upper housing prevents the first lower housing and the second lower housing form rotating about the hinge when the upper housing is in a closed configuration relative to the lower housing. The method further includes providing a rotating mechanism to allow the first lower housing portion to rotate about the hinge to an angled position that is relative to the second lower housing portion and the upper housing when the upper housing is slid to an extended position exposing a keypad of the lower housing.

The method may also include forming a substantially continuous surface by a upper surface of the lower housing and a upper surface of the upper housing by tilting the lower surface at an angle relative tot eh upper surface.

Still further, the method may include providing a clam like angled flip portion with the angled configuration of the first lower housing portion when the device is in the extended configuration. The first lower element portion snaps into place, angled toward the upper element.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A slide and tilt mechanism in a mobile communication device comprising:
    an upper element having a top and a bottom and an angled portion located at an end of the upper element, the angled portion angled relative to the top and the bottom;
    a lower element having a first lower element portion and a second lower element portion coupled together by a joint, the joint allowing the first lower element portion to fold relative to the second lower element portion and the upper element;
    a slide enabling member, coupling the upper element to the lower element such that when the upper element and the lower element are in a closed configuration, the upper element prevents the lower element from folding; and
    a biasing member, biasing the lower element to fold about the joint when the upper element is slid to an extended position.

2. The device of claim 1, further comprising a tapered portion provides a mechanical stop, to configure an angle of the second lower element when the device is in the extended configuration.

3. The device of claim 1, further comprising a first lower element overlapping portion and a second lower element overlapping portion that overlap in the closed position and the open position.

4. The device of claim 1, wherein the closed configuration comprises the first lower element portion and the second lower element portion configured longitudinally adjacent.

5. The device of claim 1, further comprising a retaining member that couples the upper element to the first lower element when the device is in the open configuration.

6. The device of claim 1, further comprising a retaining member that extends from the first lower element portion into a slot of the upper element, the latching member slides along the slot retaining the upper member adjacent to the first lower element portion as the upper element is slid from the closed configuration to an open configuration.

7. The device of claim 1, further comprising a cam surface coupled to the upper element and a follower surface coupled to the first lower element portion.

8. The device of claim 7, wherein the follower surface is a portion of a tapered portion and a portion of the bottom of the upper element, and
    the cam surface is a portion of the top of the first lower element portion.

9. The device of claim 8, wherein a distance between the cam and the top of the first lower element portion is between 0.1 mm and 0.5 mm.

10. The device of claim 1, wherein in an open position the upper element is slid in a longitudinal direction and configured in an extended configuration and the first lower housing is tilted as a result of the biasing member in a direction toward the upper housing, a portion of the first lower element contacting a tapered portion of the upper element, and
    in a closed position the upper element is configured adjacent to both the first lower element and the second lower element, holding the first lower element and the second lower element in a substantially planar configuration.

11. The device of claim 1, further comprising an exposed keypad carried on the first lower element portion when the upper housing is in the extended configuration relative to the lower element.

12. The device of claim 1, wherein the device forms a substantially continuous surface defined by an upper surface of the first lower element portion and an upper surface of the upper element.

13. A sliding hinged housing for a mobile communication device comprising:
    a first housing portion;
    a second housing portion;
    a third housing portion having a first substantially flat portion and an angled portion, the third housing portion slideably engaged to the first housing portion by a rail;
    a hinge coupling the first housing portion to the second housing portion; and
    a biasing member coupled between the first housing and the second housing, biasing the first housing to rotate about the hinge relative to the second housing in a folded configuration when the third housing is in an extended configuration, and wherein the first housing and second housing are held in an unfolded configuration when the third housing is in a closed configuration.

14. The device of claim 13, wherein the angled portion further comprising a bearing surface that engages a bearing surface of the first housing.

15. The device of claim 13, further comprising a bearing including a roller coupled to the third housing.

16. The device of claim 13, further comprising a latching member that retains the third housing to the first housing, for preventing the first housing and the second housing from disengaging when the housing is in the open configuration.

17. The housing of claim 13, further comprising two rails carried on the second housing, slideably coupling the second housing to the third housing.

18. A method for opening a slide and tilt housing for a mobile communication device, comprising;

providing a sliding mechanism to allow an upper housing to slide relative to a lower housing, wherein the upper housing is stacked on top of the lower housing, and wherein the lower housing has first lower housing portion and a second lower housing portion, wherein the first lower housing portion and the second lower housing portion are coupled together by a hinge and wherein the upper housing prevents the first lower housing and the second lower housing from rotating about the hinge when the upper housing is in a closed position relative to the lower housing; and providing a rotating mechanism to allow the first lower housing portion to rotate about the hinge to an angled position that is relative to the second lower housing portion and the upper housing when the upper housing is slid to an extended position exposing a keypad of the lower housing.

19. The method of claim 18, further comprising forming a substantially continuous surface defined by an upper surface of the lower housing and an upper surface of the upper housing.

20. The method of claim 18, further comprising providing a clam like angled flip portion with the angled configuration of the first lower housing portion when the device is in the extended configuration.

21. The method for claims 20, further comprising snapping the first lower housing portion into an angled configuration relative to the upper housing with a spring coupled to the first lower housing portion and the second lower housing element portion.

* * * * *